United States Patent
Chen et al.

(10) Patent No.: US 11,380,284 B2
(45) Date of Patent: Jul. 5, 2022

(54) COLOR SPACE MAPPING METHOD, EQUIPMENT, COMPUTER READABLE STORAGE MEDIUM, AND DEVICE

(71) Applicant: SHENZHEN TCL NEW TECHNOLOGY CO., LTD., Guangdong (CN)

(72) Inventors: Yixin Chen, Guangdong (CN); Renli Xie, Guangdong (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/258,160

(22) PCT Filed: Dec. 19, 2019

(86) PCT No.: PCT/CN2019/126634
§ 371 (c)(1),
(2) Date: Jan. 6, 2021

(87) PCT Pub. No.: WO2020/135224
PCT Pub. Date: Jul. 2, 2020

(65) Prior Publication Data
US 2021/0142762 A1    May 13, 2021

(30) Foreign Application Priority Data
Dec. 28, 2018  (CN) .......................... 201811629160.7

(51) Int. Cl.
*G09G 5/06* (2006.01)
*H04N 9/64* (2006.01)
(Continued)

(52) U.S. Cl.
CPC ............... *G09G 5/06* (2013.01); *H04N 9/646* (2013.01); *H04N 9/68* (2013.01); *H04N 9/73* (2013.01);
(Continued)

(58) Field of Classification Search
CPC .. G09G 5/06; G09G 5/028; G09G 2320/0276; G09G 2320/0285; H04N 9/646; H04N 9/68; H04N 9/73; H04N 3/127
See application file for complete search history.

(56) References Cited

U.S. PATENT DOCUMENTS

| | | |
|---|---|---|
| 2015/0062152 A1 | 3/2015 | Loeffler et al. |
| 2016/0253981 A1 | 9/2016 | Matsui |
| 2016/0329027 A1* | 11/2016 | Huang ................. H04N 13/324 |

FOREIGN PATENT DOCUMENTS

| | | |
|---|---|---|
| CN | 101527857 A | 9/2009 |
| CN | 201608833 U | 10/2010 |

(Continued)

OTHER PUBLICATIONS

First Office Action in counterpart Chinese Application No. 201811629160.7, dated Mar. 2, 2020.
(Continued)

*Primary Examiner* — Antonio A Caschera
(74) *Attorney, Agent, or Firm* — Nathan & Associates; Menachem Nathan (57) ABSTRACT

A color space mapping method includes: confirming data volume of original data, and determining a data extraction ratio according to the data volume; determining a preset order of extracting the original data according to the data extraction ratio; extracting the original data in the preset order, calculating feature data according to the extracted original data, and calculating a feature coefficient according to the original data and the feature data; generating a 3D pixel gray scale table according to the feature coefficient and the feature data; transmitting the 3D pixel gray scale table to a color processing area, to allow a target TV terminal to read a stored data content of the 3D pixel gray scale table for image color mapping; and performing the image color mapping through the 3D pixel scale table. A non-transitory
(Continued)

```
┌──────────────────────────────────────────────────────────────────┐  ╱─ S10
│ obtaining original data and feature data of a target TV          │ ╱
│ terminal image, and calculating a feature coefficient according  │╱
│ to the original data and the feature data                        │
└──────────────────────────────────────────────────────────────────┘
                              │
                              ▼
┌──────────────────────────────────────────────────────────────────┐  ╱─ S20
│ generating a 3D pixel gray scale table according to the          │ ╱
│ feature coefficient and the feature data                         │╱
└──────────────────────────────────────────────────────────────────┘
                              │
                              ▼
┌──────────────────────────────────────────────────────────────────┐  ╱─ S30
│ transmitting the 3D pixel gray scale table to a color processing │ ╱
│ area for storage, to allow a target TV terminal to read a stored │╱
│ data content of the 3D pixel gray scale table for image color    │
│ mapping                                                          │
└──────────────────────────────────────────────────────────────────┘
``` computer readable storage medium and a color space mapping device are further provided.

16 Claims, 5 Drawing Sheets

(51) Int. Cl.
    *H04N 9/68*     (2006.01)
    *H04N 9/73*     (2006.01)

(52) U.S. Cl.
    CPC ............... *G09G 2320/0276* (2013.01); *G09G 2320/0285* (2013.01)

(56) References Cited

FOREIGN PATENT DOCUMENTS

| | | | |
|---|---|---|---|
| CN | 106128373 | A | 11/2016 |
| CN | 106816143 | A | 6/2017 |
| CN | 107343187 | A | 11/2017 |
| CN | 109729333 | A | 5/2019 |

OTHER PUBLICATIONS

The Second Office Action in counterpart Chinese Application No. 201811629160.7, dated Sep. 21, 2020.
International Search Report in corresponding PCT Application No. PCT/CN2019/126634, dated Mar. 19, 2020 and Written Opinion of the International Searching Authority in corresponding PCT Application No. PCT/CN2019/126634, dated Mar. 19, 2020.

\* cited by examiner

| Built-in pattern | R | G | B | x | y | Y | Built-in pattern | R | G | B | x | y | Y |
|---|---|---|---|---|---|---|---|---|---|---|---|---|---|
| 1 | 26 | 26 | 26 | x1W | y1W | Y1W | 21 | 0 | 26 | 0 | x1G | y1G | Y1G |
| 2 | 51 | 51 | 51 | x2W | y2W | Y2W | 22 | 0 | 51 | 0 | x2G | y2G | Y2G |
| 3 | 77 | 77 | 77 | x3W | y3W | Y3W | 23 | 0 | 77 | 0 | x3G | y3G | Y3G |
| 4 | 102 | 102 | 102 | x4W | y4W | Y4W | 24 | 0 | 102 | 0 | x4G | y4G | Y4G |
| 5 | 128 | 128 | 128 | x5W | y5W | Y5W | 25 | 0 | 128 | 0 | x5G | y5G | Y5G |
| 6 | 153 | 153 | 153 | x6W | y6W | Y6W | 26 | 0 | 153 | 0 | x6G | y6G | Y6G |
| 7 | 179 | 179 | 179 | x7W | y7W | Y7W | 27 | 0 | 179 | 0 | x7G | y7G | Y7G |
| 8 | 204 | 204 | 204 | x8W | y8W | Y8W | 28 | 0 | 204 | 0 | x8G | y8G | Y8G |
| 9 | 230 | 230 | 230 | x9W | y9W | Y9W | 29 | 0 | 230 | 0 | x9G | y9G | Y9G |
| 10 | 255 | 255 | 255 | x10W | y10W | Y10W | 30 | 0 | 255 | 0 | x10G | y10G | Y10G |
| 11 | 26 | 0 | 0 | x1R | y1R | Y1R | 31 | 0 | 0 | 26 | x1B | y1B | Y1B |
| 12 | 51 | 0 | 0 | x2R | y2R | Y2R | 32 | 0 | 0 | 51 | x2B | y2B | Y2B |
| 13 | 77 | 0 | 0 | x3R | y3R | Y3R | 33 | 0 | 0 | 77 | x3B | y3B | Y3B |
| 14 | 102 | 0 | 0 | x4R | y4R | Y4R | 34 | 0 | 0 | 102 | x4B | y4B | Y4B |
| 15 | 128 | 0 | 0 | x5R | y5R | Y5R | 35 | 0 | 0 | 128 | x5B | y5B | Y5B |
| 16 | 153 | 0 | 0 | x6R | y6R | Y6R | 36 | 0 | 0 | 153 | x6B | y6B | Y6B |
| 17 | 179 | 0 | 0 | x7R | y7R | Y7R | 37 | 0 | 0 | 179 | x7B | y7B | Y7B |
| 18 | 204 | 0 | 0 | x8R | y8R | Y8R | 38 | 0 | 0 | 204 | x8B | y8B | Y8B |
| 19 | 230 | 0 | 0 | x9R | y9R | Y9R | 39 | 0 | 0 | 230 | x9B | y9B | Y9B |
| 20 | 255 | 0 | 0 | x10R | y10R | Y10R | 40 | 0 | 0 | 255 | x10B | y10B | Y10B |

FIG. 3

| feature coefficient | R | G | B |
|---|---|---|---|
| 1 | r1 | g1 | b1 |
| 2 | r2 | g2 | b2 |
| 3 | r3 | g3 | b3 |
| 4 | r4 | g4 | b4 |
| 5 | r5 | g5 | b5 |
| 6 | r6 | g6 | b6 |
| 7 | r7 | g7 | b7 |
| 8 | r8 | g8 | b8 |
| 9 | r9 | g9 | b9 |
| 10 | r10 | g10 | b10 |

FIG. 4

| calculate feature data | R | G | B | x | y | Y |
|---|---|---|---|---|---|---|
| 1 | 26 | 0 | 0 | x1R_T | y1R_T | Y1R_T |
| 2 | 51 | 0 | 0 | x2R_T | y2R_T | Y2R_T |
| 3 | 77 | 0 | 0 | x3R_T | y3R_T | Y3R_T |
| 4 | 102 | 0 | 0 | x4R_T | y4R_T | Y4R_T |
| 5 | 128 | 0 | 0 | x5R_T | y5R_T | Y5R_T |
| 6 | 153 | 0 | 0 | x6R_T | y6R_T | Y6R_T |
| 7 | 179 | 0 | 0 | x7R_T | y7R_T | Y7R_T |
| 8 | 204 | 0 | 0 | x8R_T | y8R_T | Y8R_T |
| 9 | 230 | 0 | 0 | x9R_T | y9R_T | Y9R_T |
| 10 | 255 | 0 | 0 | x10R_T | y10R_T | Y10R_T |
| 11 | 0 | 26 | 0 | x1G_T | y1G_T | Y1G_T |
| 12 | 0 | 51 | 0 | x2G_T | y2G_T | Y2G_T |
| 13 | 0 | 77 | 0 | x3G_T | y3G_T | Y3G_T |
| 14 | 0 | 102 | 0 | x4G_T | y4G_T | Y4G_T |
| 15 | 0 | 128 | 0 | x5G_T | y5G_T | Y5G_T |
| 16 | 0 | 153 | 0 | x6G_T | y6G_T | Y6G_T |
| 17 | 0 | 179 | 0 | x7G_T | y7G_T | Y7G_T |
| 18 | 0 | 204 | 0 | x8G_T | y8G_T | Y8G_T |
| 19 | 0 | 230 | 0 | x9G_T | y9G_T | Y9G_T |
| 20 | 0 | 255 | 0 | x10G_T | y10G_T | Y10G_T |
| 21 | 0 | 0 | 26 | x1B_T | y1B_T | Y1B_T |
| 22 | 0 | 0 | 51 | x2B_T | y2B_T | Y2B_T |
| 23 | 0 | 0 | 77 | x3B_T | y3B_T | Y3B_T |
| 24 | 0 | 0 | 102 | x4B_T | y4B_T | Y4B_T |
| 25 | 0 | 0 | 128 | x5B_T | y5B_T | Y5B_T |
| 26 | 0 | 0 | 153 | x6B_T | y6B_T | Y6B_T |
| 27 | 0 | 0 | 179 | x7B_T | y7B_T | Y7B_T |
| 28 | 0 | 0 | 204 | x8B_T | y8B_T | Y8B_T |
| 29 | 0 | 0 | 230 | x9B_T | y9B_T | Y9B_T |
| 30 | 0 | 0 | 255 | x10B_T | y10B_T | Y10B_T |

FIG. 5

COLOR SPACE MAPPING METHOD, EQUIPMENT, COMPUTER READABLE STORAGE MEDIUM, AND DEVICE

CROSS-REFERENCE TO RELATED APPLICATIONS

This application is the National Stage of International Application No. PCT/CN2019/126634, filed on Dec. 19, 2019, which claims priority to Chinese Application No. 201811629160.7, filed on Dec. 28, 2018, and entitled "COLOR SPACE MAPPING METHOD, EQUIPMENT, COMPUTER READABLE STORAGE MEDIUM, AND DEVICE", the entire disclosure of which is incorporated herein by reference.

TECHNICAL FIELD

The present disclosure relates to the technical field of multimedia image quality processing, and in particular to a color space mapping method, equipment, computer readable storage medium, and device.

BACKGROUND

When processing image quality of TV, in order to accurately restore the scenes and characters of the image, and achieve vivid color and high image quality, the key foundation is to have an accurate color space mapping relationship to ensure accurate restoration of chrominance and brightness. However, the color gamut and brightness of the TV are affected by its backlight system, production process, materials, etc., and the dispersion is very large. Different batches of products may vary greatly. If the correction cannot be made in a targeted manner, it will seriously affect the image quality of the TV, and the image quality of the product will be uneven.

Nowadays, since traditional correction methods are designed according to the principle of successive approximation, most manufacturers cannot perform individual color space mapping correction for each batch.

Operation 1, the data collection device collects the chrominance and brightness data of the current state of the TV and transmits it to the color space mapping and debugging system;

Operation 2, the debugging system compares the data. If it does not meet the requirements, the corresponding offset is given, which is transmitted to the TV movement through communication, and the TV movement makes adjustments and returns to operation 1; if it meets the requirements, the debugging ends.

The debugging method has the following problems: 1. Data collection, data transmission, data comparison and judgment, and register assignment are required for multiple cycles until the target chrominance and brightness are reached. The debugging takes a long time and the debugging time is unstable. 2. Only a few points can be adjusted. After adjustment, the chrominance and brightness of the entire color space cannot meet the requirements. 3. Due to the small number of adjustment points, the remaining points can only be corresponded through a simple linear relationship, which may cause the chrominance and brightness of some areas to deviate from the real target. 4. The scheme is strongly related to product characteristics. For products with different schemes, the debugging system needs to be adjusted accordingly to realize the function.

The above content is only used to assist the understanding of the technical solution of the present disclosure, and does not mean that the above content is recognized as prior art.

SUMMARY

The main objective of the present disclosure is to provide a color space mapping method, equipment, computer readable storage medium, and device, which aims to solve the technical problem of chrominance and brightness distortion caused by the problem of data collection in the debugging operation of spatial color mapping correction in the prior art.

In order to achieve the above objective, the present disclosure provides a color space mapping method, including the following operations:

obtaining original data and feature data of a target TV terminal image, and calculating a feature coefficient according to the original data and the feature data;

generating a 3D pixel gray scale table according to the feature coefficient and the feature data; and transmitting the 3D pixel gray scale table to a color processing area for storage, to allow a target TV terminal to read a stored data content of the 3D pixel gray scale table for image color mapping.

In some embodiments, the operation of obtaining original data and feature data of a target TV terminal image includes:

extracting the original data in a preset order, and calculating the feature data according to the extracted original data.

In some embodiments, before the operation of extracting the original data in a preset order, and calculating the feature data according to the extracted original data, the method further includes:

confirming data volume of the original data, and determining a data extraction ratio according to the data volume; and determining the preset order of extracting the original data according to the data extraction ratio.

In some embodiments, the operation of extracting the original data in a preset order, and calculating the feature data according to the extracted original data includes:

obtaining a preset equation set, and inputting the extracted original data into the preset equation set to obtain a calculation result; and obtaining the feature data according to the calculation result.

In some embodiments, the operation of obtaining a preset equation set, and inputting the extracted original data into the preset equation set to obtain a calculation result includes:

counting the data volume of the original data, and calculating calculation numbers of the original data according to the data volume; and inputting the extracted original data into the preset equation set according to the calculation numbers.

In some embodiments, the operation of obtaining original data and feature data of a target TV terminal image, and calculating a feature coefficient according to the original data and the feature data includes:

obtaining a preset calculation rule of the feature coefficient; and calculating the feature coefficient of the original data and the feature data according to the preset calculation rule of the feature coefficient.

In some embodiments, the operation of calculating the feature coefficient of the original data and the feature data according to the preset calculation rule of the feature coefficient includes:

according to data rules of the original data and the feature data, calculating data information of the original data and the feature data according to the preset calculation rule of the feature coefficient; and calculating the feature coefficient according to the data information.

In some embodiments, the operation of generating a 3D pixel gray scale table according to the feature coefficient and the feature data includes:

obtaining a preset algorithm for generating the 3D pixel gray scale table, and using the feature coefficient and feature data as algorithm parameters to execute a calculation operation of the preset algorithm; and generating the 3D pixel gray scale table according to a calculation result.

In some embodiments, before the operation of obtaining a preset algorithm for generating the 3D pixel gray scale table, and using the feature coefficient and feature data as algorithm parameters to execute a calculation operation of the preset algorithm, the color space mapping method further includes:

obtaining a terminal image parameter of the target TV terminal; and creating the preset algorithm for generating the 3D pixel gray scale table according to the terminal image parameter.

In some embodiments, the terminal image parameter includes color space data, white balance data and gamma data.

In some embodiments, before the operation of obtaining original data and feature data of a target TV terminal image, and calculating a feature coefficient according to the original data and the feature data, the color space mapping method further includes:

capturing a specific picture output from the target TV terminal image, and obtaining a picture display parameter of the specific picture; and confirming the original data according to the picture display parameter.

In some embodiments, the operation of confirming the original data according to the picture display parameter includes:

comparing the picture display parameter with a preset value; and confirming the picture display parameter being the original data, if the picture display parameter is greater than the preset value.

In some embodiments, the operation of capturing a specific picture output from the target TV terminal image, and obtaining a picture display parameter of the specific picture includes:

collecting picture display data of the specific picture output by the TV terminal; and generating the picture display parameter according to the picture display data.

In some embodiments, the picture display data include picture chrominance data and picture brightness data.

In some embodiments, before the operation of capturing a specific picture output from the target TV terminal image, and obtaining a picture display parameter of the specific picture, the color space mapping method further includes:

confirming a page content of a display page of the target TV terminal, and determining an output picture according to the page content; and capturing the specific picture output from the target TV terminal image, when it is confirmed that the target TV terminal outputs the specific picture.

In some embodiments, the operation of transmitting the 3D pixel gray scale table to a color processing area for storage, to allow a target TV terminal to read a stored data content of the 3D pixel gray scale table for image color mapping includes:

confirming a movement processing area of the target TV terminal, and transmitting the 3D pixel gray scale table to the movement processing area for storage.

Besides, in order to achieve the above objective, the present disclosure further provides a color space mapping equipment, including:

a calculation module for obtaining original data and feature data of a target TV terminal image, and calculating a feature coefficient according to the original data and the feature data;

a generation module for generating a 3D pixel gray scale table according to the feature coefficient and the feature data; and a mapping module for transmitting the 3D pixel gray scale table to a color processing area for storage, to allow a target TV terminal to read a stored data content of the 3D pixel gray scale table for image color mapping.

The present disclosure further provides a computer readable storage medium, a color space mapping program is stored on the computer readable storage medium, the color space mapping program, when executed by a processor, implements the following operations:

obtaining original data and feature data of a target TV terminal image, and calculating a feature coefficient according to the original data and the feature data;

generating a 3D pixel gray scale table according to the feature coefficient and the feature data; and transmitting the 3D pixel gray scale table to a color processing area for storage, to allow a target TV terminal to read a stored data content of the 3D pixel gray scale table for image color mapping.

The present disclosure further provides a color space mapping device, including a memory, a processor, a color space mapping program stored on the memory and executable on the processor, the color space mapping program, when executed by the processor, implements the following operations:

obtaining original data and feature data of a target TV terminal image, and calculating a feature coefficient according to the original data and the feature data;

generating a 3D pixel gray scale table according to the feature coefficient and the feature data; and transmitting the 3D pixel gray scale table to a color processing area for storage, to allow a target TV terminal to read a stored data content of the 3D pixel gray scale table for image color mapping.

The present disclosure provides a color space mapping method, including: obtaining original data and feature data of a target TV terminal image, and calculating a feature coefficient according to the original data and the feature data; generating a 3D pixel gray scale table according to the feature coefficient and the feature data; and transmitting the 3D pixel gray scale table to a color processing area for storage, to allow a target TV terminal to read a stored data content of the 3D pixel gray scale table for image color mapping. The 3D pixel gray scale table is calculated by obtaining the original data and feature data of the image, and the color mapping relationship in the pixel gray scale table is indexed to obtain the fast color mapping relationship of the image, thereby accurate image restoration is realized, and the beneficial effects of image color effects are improved.

The realization of the objective, functional characteristics, advantages of the present disclosure are further described with reference to the accompanying drawings.

DETAILED DESCRIPTION OF THE EMBODIMENTS

It should be understood that the specific embodiments described herein are only used to explain the present disclosure, but not to limit the present disclosure.

The main solution of the embodiments of the present disclosure is: obtaining original data and feature data of a target TV terminal image, and calculating a feature coefficient according to the original data and the feature data; generating a 3D pixel gray scale table according to the feature coefficient and the feature data; and transmitting the 3D pixel gray scale table to a color processing area for storage, to allow a target TV terminal to read a stored data content of the 3D pixel gray scale table for image color mapping.

The technical problem of chrominance and brightness distortion caused by the problem of data collection in the debugging operation of spatial color mapping correction in the prior art.

The present disclosure provides a solution. The 3D pixel gray scale table is calculated by obtaining the original data and feature data of the image, and the color mapping relationship in the pixel gray scale table is indexed to obtain the fast color mapping relationship of the image, thereby accurate image restoration is realized, and the beneficial effects of image color effects are improved.

Figure 1:
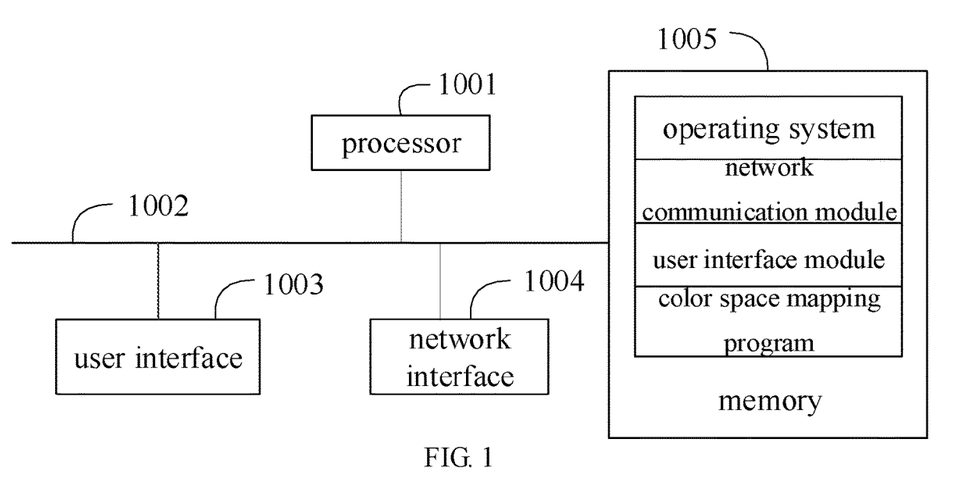
FIG. 1 is a schematic structural diagram of a terminal/apparatus in a hardware operating environment according to an embodiment of the present disclosure.

As shown in FIG. 1, FIG. 1 is a schematic structural diagram of a terminal in a hardware operating environment according to an embodiment of the present disclosure.

In some embodiments of the present disclosure, the terminal may be a PC, or may be a mobile or non-mobile terminal device with multimedia playback function, such as a smart phone, a tablet computer, an e-book reader, and a portable computer.

As shown in FIG. 1, the terminal may include a processor 1001, such as a CPU, a network interface 1004, a user interface 1003, a memory 1005, and a communication bus 1002. The communication bus 1002 is configured to implement connection and communication between these components. The user interface 1003 may include a display, an input unit such as a keyboard. The user interface 1003 may optionally include a standard wired interface and a wireless interface. The network interface 1004 may optionally include a standard wired interface and a wireless interface (such as a WI-FI interface). The memory 1005 may be a high-speed random access memory (RAM) memory or a non-volatile memory, such as a magnetic disk memory. The memory 1005 may optionally be a storage device independent of the foregoing processor 1001.

Those skilled in the art should understand that the terminal structure shown in FIG. 1 does not constitute a limitation on the terminal, and may include more or fewer components than shown in the figure, or a combination of some components, or a different arrangement of components.

As shown in FIG. 1, the memory 1005 as a computer storage medium may include an operating system, a network communication module, a user interface module, and a color space mapping program.

In the terminal shown in FIG. 1, the network interface 1004 is mainly configured to connect to a background server and perform data communication with the background server. The user interface 1003 is mainly configured to connect to a client (user) and perform data communication with the client. The processor 1001 may be configured to call the color space mapping program stored on the memory 1005, and perform the following operations:

obtaining original data and feature data of a target TV terminal image, and calculating a feature coefficient according to the original data and the feature data;

generating a 3D pixel gray scale table according to the feature coefficient and the feature data; and transmitting the 3D pixel gray scale table to a color processing area for storage, to allow a target TV terminal to read a stored data content of the 3D pixel gray scale table for image color mapping.

Further, the processor 1001 may call the color space mapping program stored on the memory 1005, and further perform the following operations:

extracting the original data in a preset order, and calculating the feature data according to the extracted original data.

Further, the processor 1001 may call the color space mapping program stored on the memory 1005, and further perform the following operations:

confirming data volume of the original data, and determining a data extraction ratio according to the data volume; and determining the preset order of extracting the original data according to the data extraction ratio.

Further, the processor 1001 may call the color space mapping program stored on the memory 1005, and further perform the following operations:

obtaining a preset equation set, and inputting the extracted original data into the preset equation set to obtain a calculation result; and obtaining the feature data according to the calculation result.

Further, the processor 1001 may call the color space mapping program stored on the memory 1005, and further perform the following operations:

counting the data volume of the original data, and calculating calculation numbers of the original data according to the data volume; and inputting the extracted original data into the preset equation set according to the calculation numbers.

Further, the processor 1001 may call the color space mapping program stored on the memory 1005, and further perform the following operations:

obtaining a preset calculation rule of the feature coefficient; and calculating the feature coefficient of the original data and the feature data according to the preset calculation rule of the feature coefficient.

Further, the processor 1001 may call the color space mapping program stored on the memory 1005, and further perform the following operations:

according to data rules of the original data and the feature data, calculating data information of the original data and the feature data according to the preset calculation rule of the feature coefficient; and calculating the feature coefficient according to the data information.

Further, the processor 1001 may call the color space mapping program stored on the memory 1005, and further perform the following operations:

obtaining a preset algorithm for generating the 3D pixel gray scale table, and using the feature coefficient and feature data as algorithm parameters to execute a calculation operation of the preset algorithm; and generating the 3D pixel gray scale table according to a calculation result.

Further, the processor 1001 may call the color space mapping program stored on the memory 1005, and further perform the following operations:

obtaining a terminal image parameter of the target TV terminal; and creating the preset algorithm for generating the 3D pixel gray scale table according to the terminal image parameter.

Further, the processor 1001 may call the color space mapping program stored on the memory 1005, and further perform the following operations:

the terminal image parameter includes color space data, white balance data and gamma data.

Further, the processor 1001 may call the color space mapping program stored on the memory 1005, and further perform the following operations:

capturing a specific picture output from the target TV terminal image, and obtaining a picture display parameter of the specific picture; and confirming the original data according to the picture display parameter.

Further, the processor 1001 may call the color space mapping program stored on the memory 1005, and further perform the following operations:

comparing the picture display parameter with a preset value; and confirming the picture display parameter being the original data, if the picture display parameter is greater than the preset value.

Further, the processor 1001 may call the color space mapping program stored on the memory 1005, and further perform the following operations:

collecting picture display data of the specific picture output by the TV terminal; and generating the picture display parameter according to the picture display data.

Further, the processor 1001 may call the color space mapping program stored on the memory 1005, and further perform the following operations:

the picture display data including picture chrominance data and picture brightness data.

Further, the processor 1001 may call the color space mapping program stored on the memory 1005, and further perform the following operations:

confirming a page content of a display page of the target TV terminal, and determining an output picture according to the page content; and capturing the specific picture output from the target TV terminal image, when it is confirmed that the target TV terminal outputs the specific picture.

Further, the processor 1001 may call the color space mapping program stored on the memory 1005, and further perform the following operations:

confirming a movement processing area of the target TV terminal, and transmitting the 3D pixel gray scale table to the movement processing area for storage.

Figure 2:
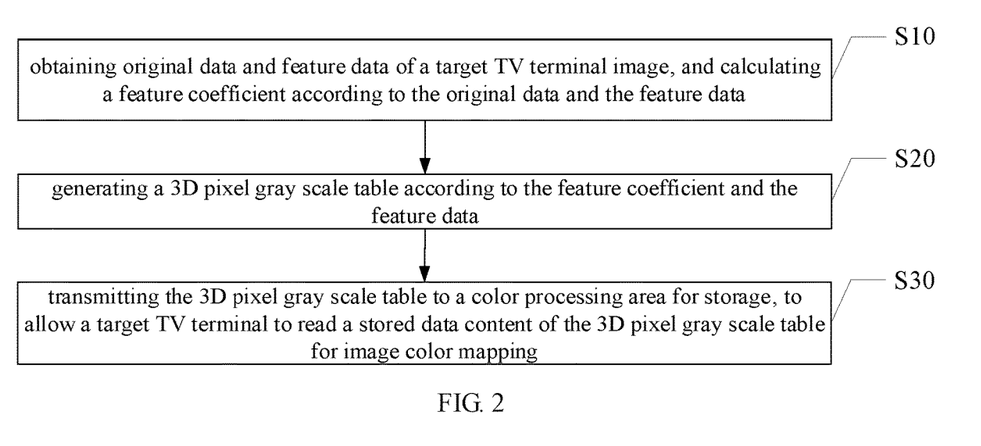
FIG. 2 is a schematic flowchart of a color space mapping method according to a first embodiment of the present disclosure.

As shown in FIG. 2, FIG. 2 is a schematic flowchart of a color space mapping method according to a first embodiment of the present disclosure. The color space mapping method includes:

Operation S10, obtaining original data and feature data of a target TV terminal image, and calculating a feature coefficient according to the original data and the feature data.

The original data and the feature data of the target TV terminal image is obtained based on the image quality processing requirements of the target TV terminal image. Both the original data and the feature data are collected based on the display image of the TV terminal. And when the original data is obtained, the original data is collected by outputting a specific picture after being displayed on the target TV. That is, the original data is the collected picture data based on the output specific picture. The specific data is data extracted according to preset rules in the obtained original data, and is defined as feature data. That is, the feature data is feature data with certain data characteristics in the original data. As such, before the operation of obtaining original data and feature data of a target TV terminal image, and calculating a feature coefficient according to the original data and the feature data, the method further includes:

capturing a specific picture output from the target TV terminal image, and obtaining a picture display parameter of the specific picture; and confirming the original data according to the picture display parameter.

In the present disclosure, when receiving the image quality processing instruction, the signal generator is controlled through the serial port to sequentially output a preset number of specific pictures to the target TV terminal, such that the target TV displays the specific picture, and controls the color temperature meter to sequentially collect and display the chrominance and brightness data of the specific picture and then returns. In practical applications, the collected original data is related to the output specific pictures. Therefore, considering the problem of image quality adjustment, the output of a preset number of original pictures is limited to achieve the effect of image quality correction. Generally, the default setting is to output 40 specific pictures, so that after the target TV terminal displays the specific pictures, 40 sets of picture display parameters based on the displayed specific pictures are collected, thereby the original data is confirmed according to the collected picture display parameters.

Figure 3:
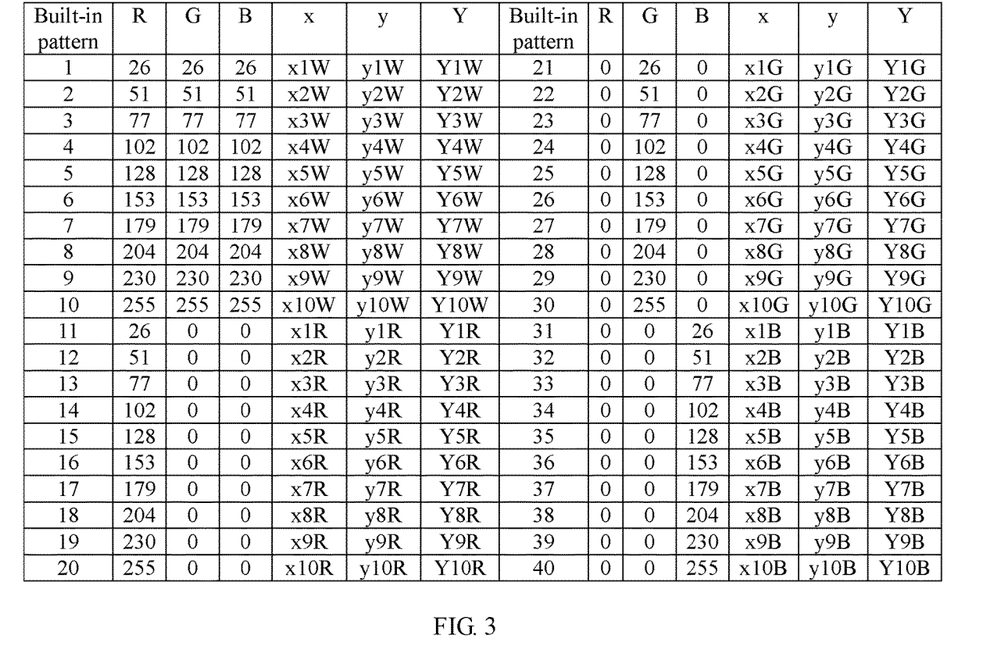
FIG. 3 is a table of chrominance values corresponding to a defined bald picture.

In practical applications, the definition of 40 specific pictures is as follows:

Pictures 1 to 10: 10 gray-scale signal pictures, taking 8 bit color depth as an example; pictures 11 to 40: R/G/B monochrome signal pictures, taking 8 bit color depth as an example. According to the defined picture information of 40 specific pictures, the corresponding R/G/B values of the specific pictures can be shown in FIG. 3.

Besides, according to the displayed specific pictures, the detailed process of collecting picture display parameters is as follows:

1. The debugging system controls the signal generator to output a specific picture i through the serial port (the initial value of i is 1).

2. The output signal is transmitted to the TV through the HDMI cable, and the TV shows the picture i.

3. The debugging system controls the color temperature meter CA310 to collect chrominance and brightness data (x, y, Y) through the serial port, and the collected data is transmitted back to the debugging system through the serial port.

4. The debugging system saves the data returned by CA310 and determined whether i is greater than 40. If yes, skip to 1.5; otherwise, increase i by i and skip to 1.1.

5. The 40 sets of chrominance and brightness data have been collected.

As described above, when collecting original data, since the source of the original data is the picture display parameter, when confirming the original data based on the collected picture display parameters, the picture display parameters may not be able to present the current TV image information well due to the influence factors such as ambient light or the display picture, the original data needs to be confirmed by screening the collected picture display parameters. That is, the operation of confirming the original data according to the picture display parameter includes:

comparing the picture display parameter with a preset value; and confirming the picture display parameter being the original data, if the picture display parameter is greater than the preset value.

After receiving the collected picture display parameter, confirm whether the picture display parameter is greater than the preset value. As mentioned above, the picture display parameter is defined as i, and it is determined whether the collected picture display parameter i is greater than 40, if so, skip to 1.5; otherwise, increase i by 1, and skip to 1.1. In this way, according to this confirmation method, the corresponding original data is confirmed according to the picture display parameter.

Besides, when confirming the feature coefficient based on the obtained original data and feature data, calculate the feature coefficient according to the preset calculation rules, i.e., the operation of obtaining original data and feature data of a target TV terminal image, and calculating a feature coefficient according to the original data and the feature data includes:

obtaining a preset calculation rule of the feature coefficient; and calculating the feature coefficient of the original data and the feature data according to the preset calculation rule of the feature coefficient.

Figure 4:
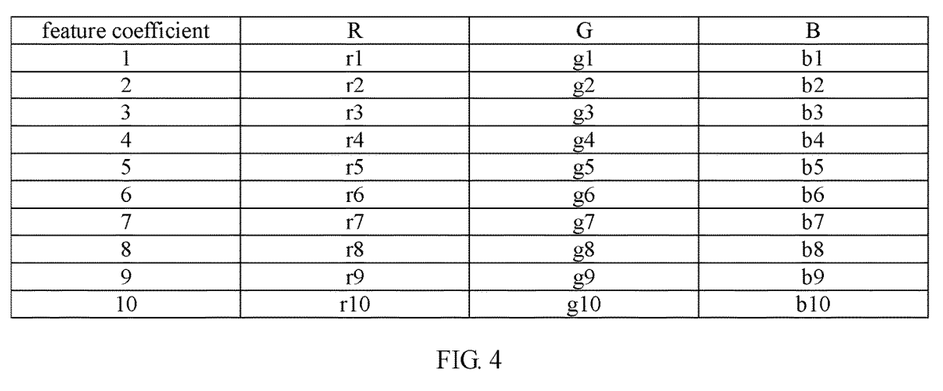
FIG. 4 is a numerical definition table of feature coefficient and feature data.

After obtaining the original data and feature data, the feature coefficient is calculated according to the original data and feature data. The calculation rule of the feature coefficient can be limited to a preset calculation formula. According to the obtained original data and feature data, define numerical values for the original data and feature data according to preset rules, and input the defined data into the preset calculation formula to calculate the feature coefficient. A single feature coefficient is related to the corresponding feature data. Therefore, the feature coefficient is consistent with the number of feature data. In practical applications, the calculation formula of a single feature coefficient can be defined as $r1=Y1R\_T/Y1R$. The numerical definition of the related original data and feature data can be shown in FIG. 4.

Further, when the corresponding feature coefficient is calculated according to the original data and feature data, since the feature data is related to the original data, when the original data is obtained, the corresponding feature data needs to be confirmed according to the original data. That is, the operation of obtaining original data and feature data of a target TV terminal image includes:

extracting the original data in a preset order, and calculating the feature data according to the extracted original data.

Figure 5:
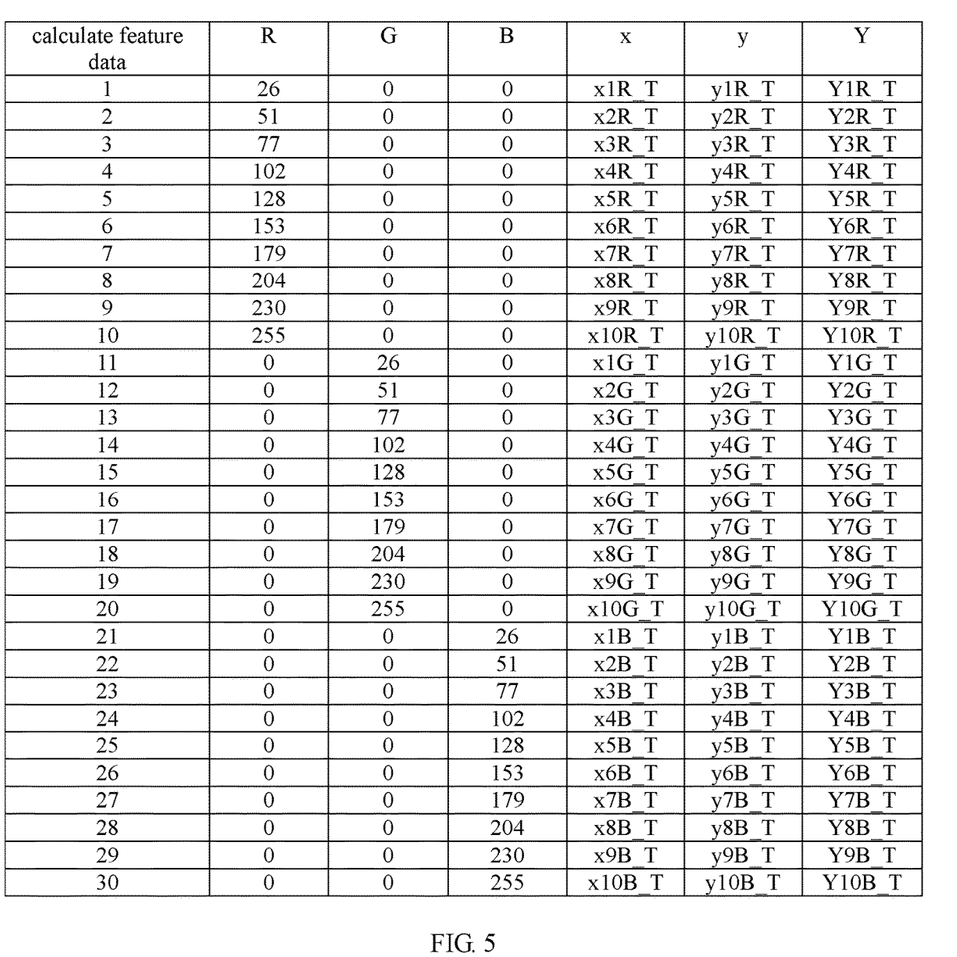
FIG. 5 is a detailed diagram of extracted test data.

According to the obtained original data, after the number of the original data has been set, the original data in a specific order from the original data is extracted, and the feature data according to the extracted original data is calculated. As mentioned above, if the number of original data is 40 sets, the original data will be extracted in a specific order in the 40 sets of original data. Due to the specific image type of the original data source, generally, the first to tenth, the twentieth, the thirtieth, and the fortieth sets of the 40 sets of original data are extracted, that is, a total of thirteen sets of data are used to calculate the key feature data. In practical applications, according to the collected 40 sets of data, the system first selects 13 designated sets (the test data corresponding to pictures 1-10, pictures 20, 30, 40, respectively). When the key 30 sets of feature data are calculated by a specific algorithm, the calculation process can be divided into 9 times, and the calculation operation is related to the test data. The detailed data content of the test data is shown in FIG. 5, and the specific detailed process of the calculation operation is as follows:

1. Obtain the test data of picture 5 and pictures 20, 30, and 40. The test data are as follows:

Picture 5: color coordinate (x5W, y5W) and brightness y5W of the 128-level white field signal;

Picture 20: color coordinate (x10R, y10R) and brightness Y10R corresponding to the 255-level R field;

Picture 30: color coordinate (x10G, y10G) and brightness Y10G corresponding to the 255-level G field;

Picture 40: color coordinate (x10B, y10B) and brightness Y10B corresponding to the 255-level B field;

2. Set the parameters and define the brightness of the 128-level R/G/B field to be calculated as Y5R_T, Y5G_T, Y5B_T;

3. Construct an equation set to calculate the brightness Y5R_T, Y5G_T, Y5B_T corresponding to 128-level R/G/B field. Assuming that the color coordinates of the R/G/B monochromatic field remain unchanged, and the brightness Y5R_T, Y5G_T, Y5B_T of the 128-level R/G/B field can be obtained to combine the solved equations. The specific confirmation formulas are as follows:

$$Y5R\_T = \frac{y10R(x10Gy10B - x5wy10B - x10By10G + x5wy10G + x10By5w - x10Gy5W)Y5W}{(-x10Gy10B + x10Ry10B + x10By10G - x10Ry10G - x10By10R + x10Gy10R)y5W}$$

$$Y5G\_T = \frac{y10R(-x10Ry10B + x5Wy10B + x10Ry10R - x5Wy10R - x10By5W + x10Ry5W)Y5W}{(x10Gy10B - x10Ry10B - x10By10G + x10Ry10G + x10By10R - x10Gy10R)y5W}$$

$$Y5B\_T = \frac{(-x10Ry10By10G + x5Wy10By10G + x10Gy10By10R - x5Wy10By10R - x10Gy10By5W + x10Ry10By5W)Y5W}{((x10Gy10B - x10Ry10B - x10By10G + x10Ry10G + x10By10R - x10Gy10R)y5W)}$$

Further, the confirmation method of the feature data mentioned above is related to the parameter variable, therefore the operation of extracting the original data in a preset order, and calculating the feature data according to the extracted original data includes:

obtaining a preset equation set, and inputting the extracted original data into the preset equation set;

performing a calculation operation of the preset equation set, and obtaining the feature data according to a calculation result of the calculation operation.

Operation S20, generating a 3D pixel gray scale table according to the feature coefficient and the feature data.

According to the calculated feature coefficient and feature data, the feature coefficient and feature data are respectively input to a preset algorithm, and a 3D pixel gray scale table is generated according to the numerical value of the calculation result. The 3D pixel gray scale table contains an equal number of sub-elements, and the sub-elements are divided into r, g, b. In the 3D pixel gray scale table, the specific values include a 3D pixel gray scale information of 20 layers, 20 rows and 20 columns. In practical applications, the corresponding r/g/b can be queried separately through the index value R/G/B. In this way, the value query function of color mapping is realized through the mapping relationship of the index value.

As mentioned above, when calculating the 3D pixel gray scale table, taking into account the current terminal device problem of the target TV terminal, in order to improve the color value accuracy of the 3D pixel gray scale table, the operation of generating a 3D pixel gray scale table according to the calculated feature coefficient and feature data includes:

obtaining a preset algorithm for generating the 3D pixel gray scale table, and using the feature coefficient and feature data as algorithm parameters to execute a calculation operation of the preset algorithm; and generating the 3D pixel gray scale table according to a calculation result.

According to the target TV terminal, when the 3D pixel gray scale table is calculated according to the feature coefficient and feature data, the terminal image parameter of the target TV terminal is obtained. The terminal image parameter mainly refers to the color deviation data of the terminal based on the device hardware. In practical applications, the terminal image parameter mainly includes color space, white balance and gamma data. The obtained terminal image parameter is input into the preset calculation formula. The feature coefficient and feature data are then calculated according to the calculation formula defined by the terminal image parameter, and a 3D LUT with 20 layers, 20 rows and 20 columns is calculated and generated (the number of layers corresponds to R, the number of rows corresponds to G, and the number of columns corresponds to B).

Operation S30, transmitting the 3D pixel gray scale table to a color processing area for storage, to allow a target TV terminal to read a stored data content of the 3D pixel gray scale table for image color mapping.

After the 3D pixel gray table based on the color mapping has been generated, the screen color mapping of the target TV terminal is performed according to the color mapping relationship in the 3D pixel gray table. In practical applications, the 3D pixel gray scale can be transmitted to the TV's movement, so that the movement can react to make it effective, and then accurate color space mapping can be achieved, and the target white balance and gamma can be achieved.

In this embodiment, the 3D pixel gray scale table is calculated by obtaining the original data and feature data of the image, and the color mapping relationship in the pixel gray scale table is indexed to obtain the fast color mapping relationship of the image, thereby accurate image restoration is realized, and the beneficial effects of image color effects are improved.

Besides, the embodiments of the present disclosure further provides a computer readable storage medium, a color space mapping program is stored on the computer readable storage medium, the color space mapping program, when executed by a processor, implements the following operations:

obtaining original data and feature data of a target TV terminal image, and calculating a feature coefficient according to the original data and the feature data;

generating a 3D pixel gray scale table according to the feature coefficient and the feature data; and transmitting the 3D pixel gray scale table to a color processing area for storage, to allow a target TV terminal to read a stored data content of the 3D pixel gray scale table for image color mapping.

Further, the color space mapping program, when executed by the processor, further implements the following operations:

extracting the original data in a preset order, and calculating the feature data according to the extracted original data.

Further, the color space mapping program, when executed by the processor, further implements the following operations:

confirming data volume of the original data, and determining a data extraction ratio according to the data volume; and determining the preset order of extracting the original data according to the data extraction ratio.

Further, the color space mapping program, when executed by the processor, further implements the following operations:

obtaining a preset equation set, and inputting the extracted original data into the preset equation set to obtain a calculation result; and obtaining the feature data according to the calculation result.

Further, the color space mapping program, when executed by the processor, further implements the following operations:

counting the data volume of the original data, and calculating calculation numbers of the original data according to the data volume; and inputting the extracted original data into the preset equation set according to the calculation numbers.

Further, the color space mapping program, when executed by the processor, further implements the following operations:

obtaining a preset calculation rule of the feature coefficient; and calculating the feature coefficient of the original data and the feature data according to the preset calculation rule of the feature coefficient.

Further, the color space mapping program, when executed by the processor, further implements the following operations:

according to data rules of the original data and the feature data, calculating data information of the original data and the feature data according to the preset calculation rule of the feature coefficient; and calculating the feature coefficient according to the data information.

Further, the color space mapping program, when executed by the processor, further implements the following operations:

obtaining a preset algorithm for generating the 3D pixel gray scale table, and using the feature coefficient and feature data as algorithm parameters to execute a calculation operation of the preset algorithm; and generating the 3D pixel gray scale table according to a calculation result.

Further, the color space mapping program, when executed by the processor, further implements the following operations:

obtaining a terminal image parameter of the target TV terminal; and creating the preset algorithm for generating the 3D pixel gray scale table according to the terminal image parameter.

Further, the color space mapping program, when executed by the processor, further implements the following operations:

the terminal image parameter includes color space data, white balance data and gamma data.

Further, the color space mapping program, when executed by the processor, further implements the following operations:

capturing a specific picture output from the target TV terminal image, and obtaining a picture display parameter of the specific picture; and confirming the original data according to the picture display parameter.

Further, the color space mapping program, when executed by the processor, further implements the following operations:

comparing the picture display parameter with a preset value; and confirming the picture display parameter being the original data, if the picture display parameter is greater than the preset value.

Further, the color space mapping program, when executed by the processor, further implements the following operations:

collecting picture display data of the specific picture output by the TV terminal; and generating the picture display parameter according to the picture display data.

Further, the color space mapping program, when executed by the processor, further implements the following operations:

the picture display data include picture chrominance data and picture brightness data.

Further, the color space mapping program, when executed by the processor, further implements the following operations:

confirming a page content of a display page of the target TV terminal, and determining an output picture according to the page content; and capturing the specific picture output from the target TV terminal image, when it is confirmed that the target TV terminal outputs the specific picture.

Further, the color space mapping program, when executed by the processor, further implements the following operations:

confirming a movement processing area of the target TV terminal, and transmitting the 3D pixel gray scale table to the movement processing area for storage.

It should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The serial numbers of the foregoing embodiments of the present disclosure are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present disclosure can be embodied in the form of software product in essence or the part that contributes to the existing technology. The computer software product is stored on a storage medium (such as ROM/RAM, magnetic disk, optical disk) as described above, including several instructions to cause a terminal device (which can be a mobile phone, a computer, a server, an air conditioner, or a network device, etc.) to execute the method described in each embodiment of the present disclosure.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A color space mapping method, comprising the following operations:

confirming data volume of original data, and determining a data extraction ratio according to the data volume;

determining a preset order of extracting the original data according to the data extraction ratio;

extracting the original data in the preset order, calculating feature data according to the extracted original data, and calculating a feature coefficient according to the original data and the feature data;

generating a 3D pixel gray scale table according to the feature coefficient and the feature data;

transmitting the 3D pixel gray scale table to a color processing area for storage, to allow a target TV terminal to read a stored data content of the 3D pixel gray scale table for image color mapping; and performing the image color mapping through the 3D pixel scale table.

2. The color space mapping method of claim 1, wherein the operation of extracting the original data in a preset order, and calculating the feature data according to the extracted original data comprises:

obtaining a preset equation set, and inputting the extracted original data into the preset equation set to obtain a calculation result; and obtaining the feature data according to the calculation result.

3. The color space mapping method of claim 2, wherein the operation of obtaining a preset equation set, and inputting the extracted original data into the preset equation set to obtain a calculation result comprises:

counting the data volume of the original data, and calculating calculation numbers of the original data according to the data volume; and inputting the extracted original data into the preset equation set according to the calculation numbers.

4. The color space mapping method of claim 1, wherein the operation of obtaining original data and feature data of a target TV terminal image, and calculating a feature coefficient according to the original data and the feature data comprises:

obtaining a preset calculation rule of the feature coefficient; and calculating the feature coefficient of the original data and the feature data according to the preset calculation rule of the feature coefficient.

5. The color space mapping method of claim 4, wherein the operation of calculating the feature coefficient of the original data and the feature data according to the preset calculation rule of the feature coefficient comprises:

according to data rules of the original data and the feature data, calculating data information of the original data and the feature data according to the preset calculation rule of the feature coefficient; and calculating the feature coefficient according to the data information.

6. The color space mapping method of claim 1, wherein the operation of generating a 3D pixel gray scale table according to the feature coefficient and the feature data comprises:

obtaining a preset algorithm for generating the 3D pixel gray scale table, and using the feature coefficient and feature data as algorithm parameters to execute a calculation operation of the preset algorithm; and generating the 3D pixel gray scale table according to a calculation result.

7. The color space mapping method of claim 6, wherein before the operation of obtaining a preset algorithm for generating the 3D pixel gray scale table, and using the feature coefficient and feature data as algorithm parameters to execute a calculation operation of the preset algorithm, the color space mapping method further comprises:

obtaining a terminal image parameter of the target TV terminal; and creating the preset algorithm for generating the 3D pixel gray scale table according to the terminal image parameter.

8. The color space mapping method of claim 7, wherein the terminal image parameter comprises color space data, white balance data and gamma data.

9. The color space mapping method of claim 1, wherein before the operation of obtaining original data and feature data of a target TV terminal image, and calculating a feature coefficient according to the original data and the feature data, the color space mapping method further comprises:

capturing a specific picture output from the target TV terminal image, and obtaining a picture display parameter of the specific picture; and confirming the original data according to the picture display parameter.

10. The color space mapping method of claim 9, wherein the operation of confirming the original data according to the picture display parameter comprises:

comparing the picture display parameter with a preset value; and confirming the picture display parameter being the original data, if the picture display parameter is greater than the preset value.

11. The color space mapping method of claim 9, wherein the operation of capturing a specific picture output from the target TV terminal image, and obtaining a picture display parameter of the specific picture comprises:

collecting picture display data of the specific picture output by the TV terminal; and generating the picture display parameter according to the picture display data.

12. The color space mapping method of claim 11, wherein the picture display data comprise picture chrominance data and picture brightness data.

13. The color space mapping method of claim 9, wherein before the operation of capturing a specific picture output from the target TV terminal image, and obtaining a picture display parameter of the specific picture, the color space mapping method further comprises:

confirming a page content of a display page of the target TV terminal, and determining an output picture according to the page content; and capturing the specific picture output from the target TV terminal image, when it is confirmed that the target TV terminal outputs the specific picture.

14. The color space mapping method of claim 1, wherein the operation of transmitting the 3D pixel gray scale table to a color processing area for storage, to allow a target TV terminal to read a stored data content of the 3D pixel gray scale table for image color mapping comprises:

confirming a movement processing area of the target TV terminal, and transmitting the 3D pixel gray scale table to the movement processing area for storage.

15. A non-transitory computer readable storage medium, wherein a color space mapping program is stored on the computer readable storage medium, the color space mapping program, when executed by a processor, implements the following operations:

confirming data volume of original data, and determining a data extraction ratio according to the data volume;

determining a preset order of extracting the original data according to the data extraction ratio;

extracting the original data in the preset order, calculating feature data according to the extracted original data, and calculating a feature coefficient according to the original data and the feature data;

generating a 3D pixel gray scale table according to the feature coefficient and the feature data;

transmitting the 3D pixel gray scale table to a color processing area for storage, to allow a target TV terminal to read a stored data content of the 3D pixel gray scale table for image color mapping; and performing the image color mapping through the 3D pixel scale table.

16. A color space mapping device, comprising a memory, a processor, a color space mapping program stored on the memory and executable on the processor, the color space mapping program, when executed by the processor, implements the following operations:

confirming data volume of original data, and determining a data extraction ratio according to the data volume;

determining a preset order of extracting the original data according to the data extraction ratio;

extracting the original data in the preset order, calculating feature data according to the extracted original data, and calculating a feature coefficient according to the original data and the feature data;

generating a 3D pixel gray scale table according to the feature coefficient and the feature data;

transmitting the 3D pixel gray scale table to a color processing area for storage, to allow a target TV terminal to read a stored data content of the 3D pixel gray scale table for image color mapping; and performing the image color mapping through the 3D pixel scale table.

* * * * *